(12) United States Patent
Katoozian

(10) Patent No.: US 11,037,393 B2
(45) Date of Patent: Jun. 15, 2021

(54) DUAL DIRECTIONAL GATE ASSEMBLY

(71) Applicant: Kambiz Katoozian, Kirkland, WA (US)

(72) Inventor: Kambiz Katoozian, Kirkland, WA (US)

( * ) Notice: Subject to any disclaimer, the term of this patent is extended or adjusted under 35 U.S.C. 154(b) by 0 days.

(21) Appl. No.: 16/693,851

(22) Filed: Nov. 25, 2019

(65) Prior Publication Data

US 2020/0193761 A1 Jun. 18, 2020

Related U.S. Application Data

(62) Division of application No. 15/415,765, filed on Jan. 25, 2017, now Pat. No. 10,490,015.

(60) Provisional application No. 62/286,498, filed on Jan. 26, 2016.

(51) Int. Cl.
*B62B 3/02* (2006.01)
*G07F 11/00* (2006.01)
*G07F 17/00* (2006.01)

(52) U.S. Cl.
CPC .......... *G07F 17/0057* (2013.01); *B62B 3/027* (2013.01); *G07F 11/005* (2013.01)

(58) Field of Classification Search
CPC ..... B62B 3/027; G07F 11/005; G07F 17/0057
See application file for complete search history.

(56) References Cited

U.S. PATENT DOCUMENTS

| 3,165,189 | A | * | 1/1965 | Easterday | G07F 7/0627 |
| | | | | | 194/212 |
| 3,772,994 | A | * | 11/1973 | Juarbe | B62B 5/0423 |
| | | | | | 104/140 |
| 3,897,863 | A | * | 8/1975 | Peggs | G07F 7/0627 |
| | | | | | 194/212 |
| 3,938,638 | A | * | 2/1976 | Moule | A47F 10/04 |
| | | | | | 194/211 |
| 3,978,959 | A | * | 9/1976 | Muellner | G07F 7/0636 |
| | | | | | 194/211 |
| 4,450,968 | A | * | 5/1984 | Muellner | A47F 10/04 |
| | | | | | 194/905 |
| 4,524,985 | A | * | 6/1985 | Drake | B62B 5/0423 |
| | | | | | 188/5 |

(Continued)

*Primary Examiner* — Gene O Crawford
*Assistant Examiner* — Kelvin L Randall, Jr.
(74) *Attorney, Agent, or Firm* — Dean A. Craine, P.S.

(57) ABSTRACT

A dual directional gate that allows an object to move freely in one direction over the gate, but limits the removable of one object over the gate in the opposite direction. The gate assembly includes a blocking arm, a cam element and a protruding arm mounted on a rotating driver shaft. The gate assembly also includes a drive shaft parallel to said driver shaft. Mounted on the drive shaft is a latch mounted on the drive shaft with a proximal end that presses against the cam element and prevents rotation of the blocking arm towards the latch. Also mounted on the drive shaft is a biased follower rod with a distal end that contacts the protruding arm when rotated towards the drive shaft. The gate also includes a pivotally mounted sub-assembly coupled to a solenoid. When the solenoid is activated, the sub-assembly rotates which allows the latch to rotate and unblock the blocking arm and allow an object to forcibly move the blocking arm. Movement of the blocking arm causes the gate toy reset.

2 Claims, 21 Drawing Sheets

(56) References Cited

U.S. PATENT DOCUMENTS

| | | | | |
|---|---|---|---|---|
| 6,142,283 A | * | 11/2000 | Amdahl | G07G 1/0081 |
| | | | | 194/205 |
| 2007/0239465 A1 | * | 10/2007 | Le Gars | G06Q 20/10 |
| | | | | 705/39 |

* cited by examiner

DUAL DIRECTIONAL GATE ASSEMBLY

This is a divisional patent application based on U.S. utility patent application (application Ser. No. 15/415,765) filed on Jan. 25, 2017 which was based on and claimed the priority to the U.S. provisional patent application (Application No. 62/286,498) filed on Jan. 26, 2016.

Notice is given that this patent document contains original material subject to copyright protection. The copyright owner has no objection to the facsimile or digital download reproduction of all or part of the patent document, but otherwise reserves all copyrights.

This non-provisional patent application is based on and claims the filing date benefit of U.S. provisional patent application (Application No. 62/286,498), filed on Jan. 25, 2016.

BACKGROUND OF THE INVENTION

1. Field of the Invention

This invention pertains to pushcart vending systems for a store or shopping mall, and more particularly to pushcart vending systems that are compact and may be setup in different configurations to fit within different floor spaces in stores or shopping malls.

2. Description of the Related Art

Large stores and shopping malls provide ornate pushcarts with lightweight bodies made of plastic or fiberglass that simulate a motor vehicle, train, airplane or an animal that appeal to small children. Because the pushcarts are more expensive and larger than standard shopping pushcarts, most store and mall operators setup staging areas where the pushcarts are distributed and returned.

The pushcarts are rented to shoppers via coin or credit card vending systems. The vending systems include vending units and tracks that control the distribution and return of pushcarts. The vending systems are self-managing that allows shopping mall customers to rent and remove individual pushcarts from the track after submission of a payment. Typically, vending systems are designed so pushcarts are dispensed from one end of a track and returned at the opposite end of the track. Unfortunately, such vending systems require track configurations that wide-open areas adjacent to the ends of track and allow the pushcart to be removed or returned.

What is needed is a compact vending system that includes folding pushcart that attaches to a single track and stored in a compact configuration on the track and also allows the pushcart to be dispensed and returned from the same end of the track.

SUMMARY OF THE INVENTION

Disclosed is a compact, space saving push pushcart dispensing and return system that includes a plurality of foldable pushcart, a vending unit, a track and a gate assembly attached to the track that enables individual pushcart to be dispensed and returned to the same end of the track reducing the staging area for the system.

The system is used with pushcart as shown in U.S. Pat. No. 6,536,786 entitled "Stackable Pushcart" issued on Mar. 25, 2003, and now incorporated here. The stackable pushcart includes a vehicle-shaped body designed for transporting small children and cargo. The body of each pushcart extends horizontally over a lower rigid frame assembly and. rotated around its rear end to a vertical position that enables the rigid frames to nest together in a longitudinally stacked configuration in a confined space. Each pushcart includes a lightweight frame assembly, an upward extending handle assembly, and a pivoting vehicle-shaped body. The vehicle-shaped body is disposed horizontally over the frame assembly and pivots upward on its rear section around a support member. The frame assembly is horizontally stacked with a longitudinally aligned adjacent pushcart when the body is disposed vertically on the frame assembly. The frame assembly includes two front caster wheels and two rear large diameter wheels. The vehicle-shaped body includes a floor and has a unique outer shape enabling the body to be rotated on one end and vertically aligned so the pushcart can be slid together and horizontally stacked in a compact manner with other similar pushcart. It should be understood that the body can be any configuration (e.g. wagon, animal, airplane, train, etc.) so long as it pivots on a frame assembly.

The track is made of a plurality of track sections connected in an end to end manner to form a hollow, continuous track structure. Each track section is made of metal and is square or rectangular in cross section. A continuous, longitudinally aligned slot is formed on. the top surface of the track. The slot is offset from the track's longitudinally axis. The track has an open end and a closed end. The open end of the track is near a vending unit that controls the operation of a dual directional gate assembly mounted inside the track near the open end. When the desired money, tokens, or credit/debit transaction card are deposited into the vending unit a release signal is sent to the dual directional gate assembly. The dual directional gate assembly includes a blocking arm located inside the track that blocks discharge movement of the pushcart over the track. When a release signal is received from the vending unit, the blocking arm is momentarily released allowing one pushcart to move longitudinally over the blocking arm. After the one pushcart moves over the blocking arm, the blocking arm is automatically reset into a blocking position.

Extending downward from the frame assembly on each pushcart is a catch bar assembly that includes a vertical wear plate that extends into a longitudinally aligned slot formed on the top flange of a track. The wear plate extends downward offset from the catch bar assembly. Attached to the wear plate is an upper roller and a lower roller. The rollers are parallel and oriented perpendicular on one side of the wear plate in one embodiment, the wear plate includes a metal sensing plate configured to be detected by sensors mounted on the elongated box discussed further below.

During use, the catch bar assembly is inserted into the open end of the track. The wear plate fits into the slot and the upper roller rolls over the outside surface of the top flange of the track and the lower roller rolls against the inside surface of top flange. Then the pushcart is moved over the track, the wear plate slides inside the slot and the lower roller is located inside the track and presses against a blocking arm on a gate assembly located inside the track.

The gate assembly includes an enclosure box located near the track's entry open end, Extending laterally from one end of the enclosure box is a blocking arm that blocks outward movement of the pushcart over the track. The blocking arm is mounted on a driver shaft. Attached to the driver shaft and inside the enclosure is a cam element. Also located inside the enclosure is a latch, a follower arm, and a solenoid. When payment is entered into the vending unit, a release signal is sent from the vending unit to the solenoid in the gate assembly. When the solenoid is activated, the latch is moved that unlocks the blocking arm allowing it to rotate. The pushcart and the catch bar assembly attached thereto can now travel over the blocking arm. After the catch bar assembly moves over the blocking arm, the blocking arm is automatically reset into a blocking position so only one pushcart may be removed from the track.

When the pushcart is returned, the catch bar assembly is aligned over the entry open end of the track and the wear plate is aligned with the slot. As the pushcart is moved along the track, the catch bar assembly slides along the slot and presses against the blocking arm causing it to rotate. Because rotation of the blocking arm is blocked in the direction that allows a pushcart to be removed, the pushcart is prevented from moving forward and being removed from the track once the pushcart is pressed passed the blocking arm.

On one embodiment, the vending system includes a token or payment system that rewards customers that return the pushcart to the track. The token or payment system includes at least two sensors located on the sides of the elongated box near the elongated box's opposite ends. When the pushcart is returned, the catch bar assembly is aligned over the entry open end of the track and the wear plate is aligned with the slot. An identification code may be associated with each wear plate enabling the vending unit to identify the pushcart being returned.

As the pushcart is moved along the track, the catch bar assembly slides along the slot the wear plate passes over a first sensor mounted on the inside surface of the elongated box. A signal is sent to the vending machine informing the vending machine a pushcart is being returned and the wear plate passes over a second sensor. A second return signal is then sent to the vending unit. The vending unit then releases a token or partial refund of the rental fee.

DESCRIPTION OF THE PREFERRED EMBODIMENT(S)

Figure 11:
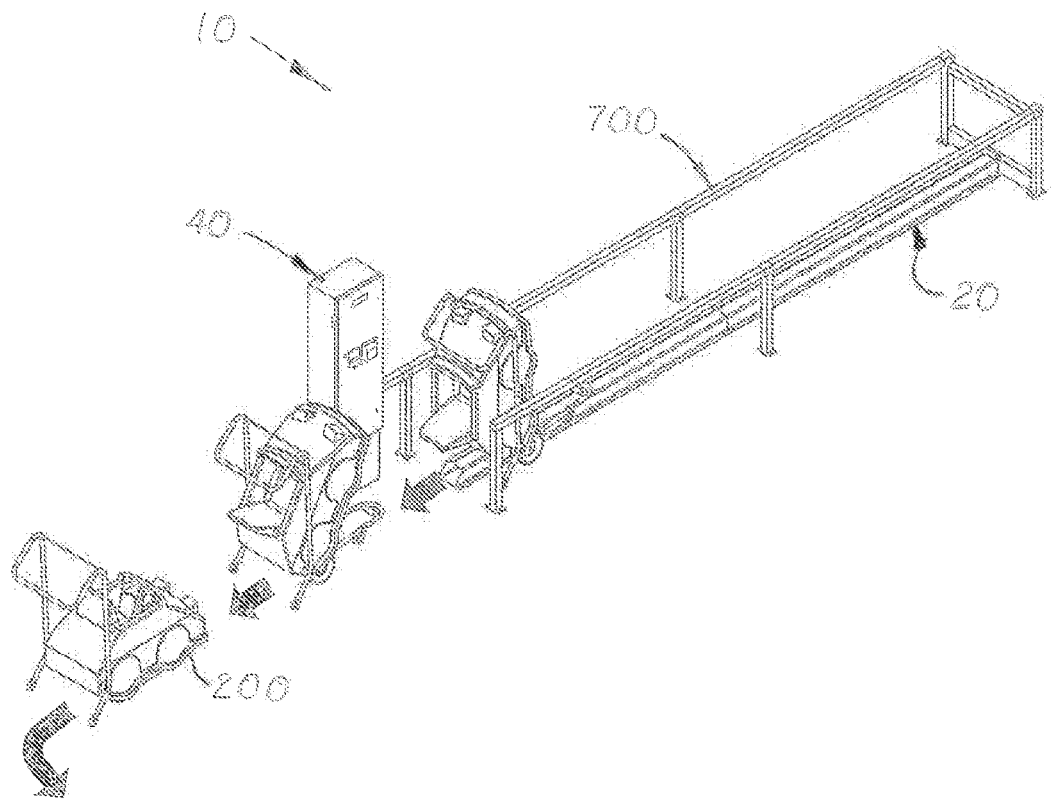
FIGS. 11 and 12 are perspective views of the single-track pushcart vending system showing three push pushcart s being folded into a compact configuration and returned to the track.
Figure 12:
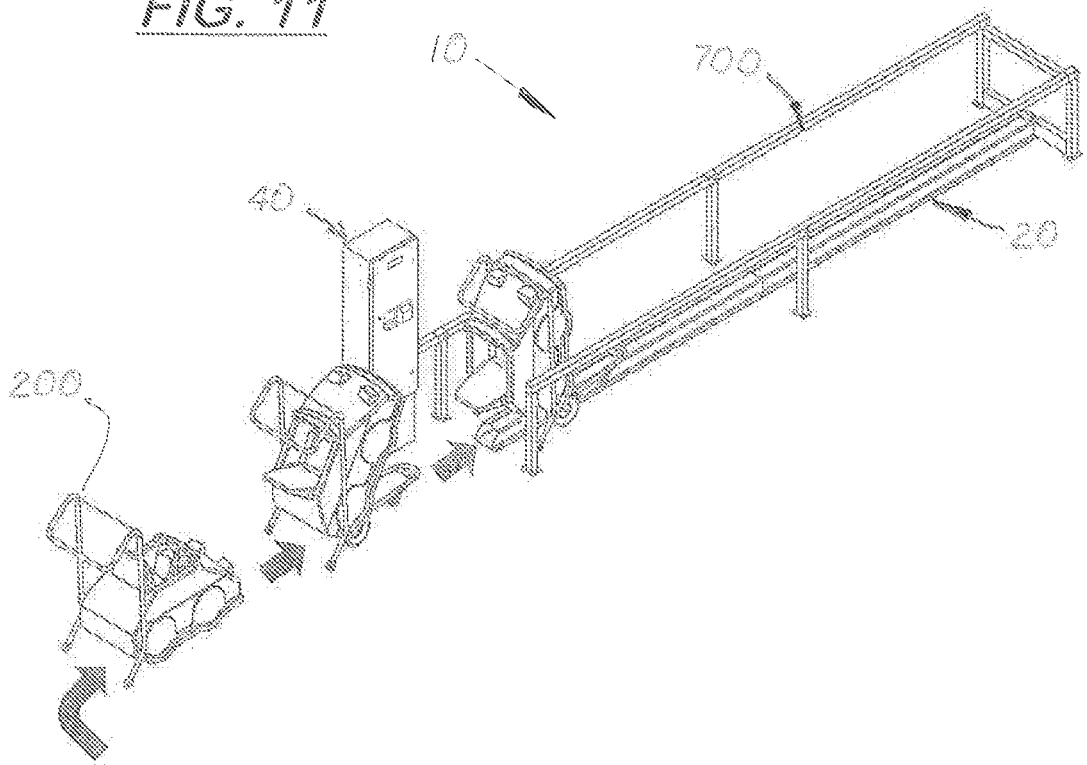

Referring to the Figs. there is disclosed is a compact, space saving pushcart dispensing and return system 10 that includes a plurality of foldable pushcarts 200, a track 20 vending unit 40, a track and a gate assembly 60 attached to the track 20 that enables individual pushcarts 200 to be dispensed (see FIG. 11) or returned (see FIG. 12) to the same end of the track 20 reducing the staging area for the vending system 10.

Figure 1:
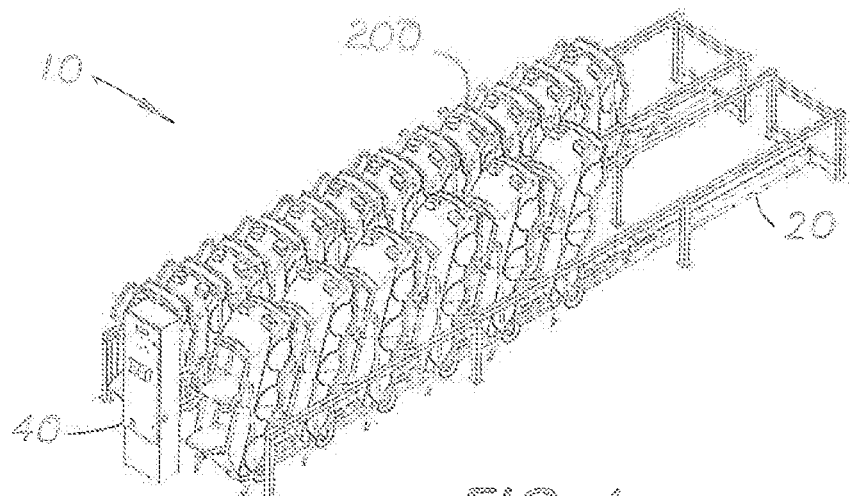
FIG. 1 is a perspective view of the pushcart vending system disclosed configured with two parallel tracks.
Figure 2:
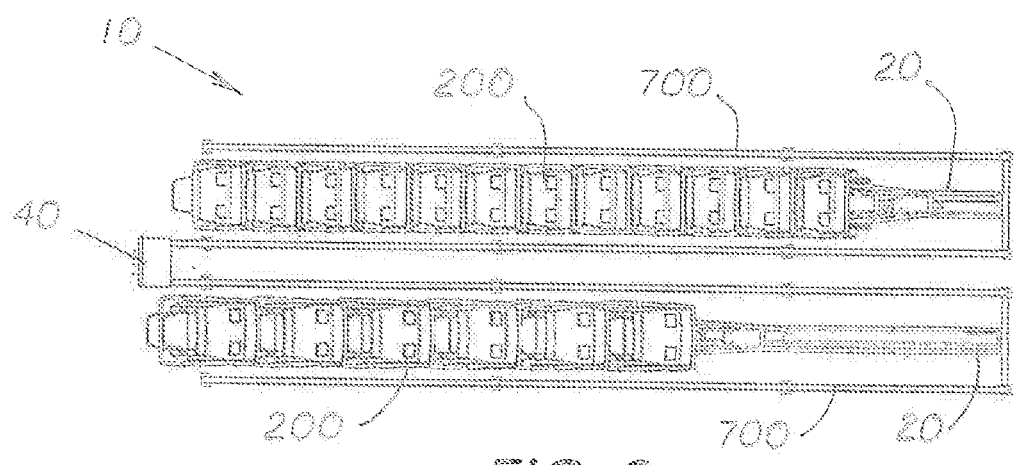
FIG. 2 is a top plan view of the pushcart vending system shown in FIG. 1
Figure 3:
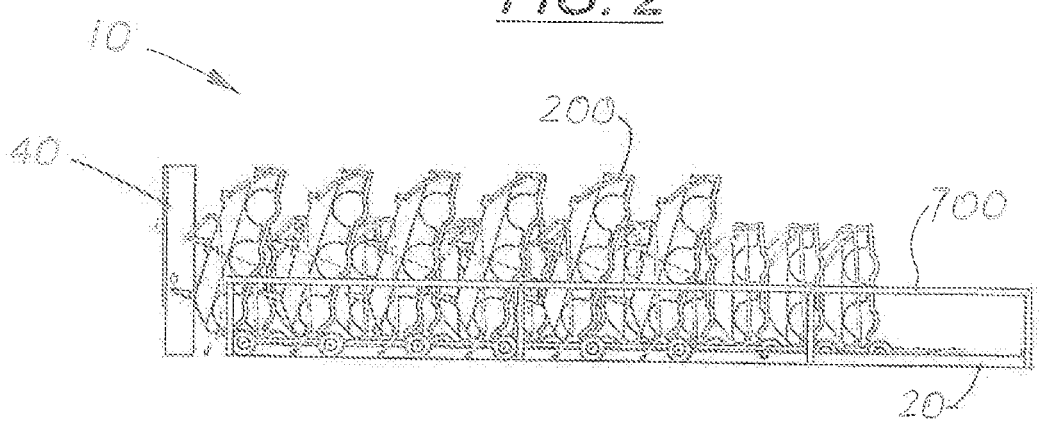
FIG. 3 is a side elevational view of the pushcart vending system shown in FIG. 1.

The system 10 is used with pushcart 200 as shown in U.S. Pat. No. 6,536,786 entitled "Stackable Pushcart 200" issued on Mar. 25, 2003, and now incorporated here. The stackable pushcarts 200 shown in FIGS. 13, 14 include a vehicle-shaped body 202 designed for transporting small children and cargo. The body 202 of each pushcart 200 extends horizontally over a lower rigid frame assembly 204 and rotated around its rear end to vertical position that enables the rigid frame assembly 204 to mesh so a plurality of pushcart 200 may be stacked in a small confined space. The vehicle-shaped body 202 is disposed horizontally over the frame assembly 204 and pivots upward on its rear section around a support member 208. The frame assembly 204 is designed to be horizontally stacked with longitudinally aligned adjacent pushcart 200 when the body 202 is disposed vertically. The frame assembly 204 includes two front caster wheels 210 and two rear large diameter wheels 212. The body 202 includes a fully extending floor and has a unique outer shape enabling the body 202 to be vertically aligned so that adjacent pushcarts 200 can slid together and horizontally stacked as shown in FIGS. 1-3. It should be understood that the body 202 can be any configuration (e.g. wagon, animal, airplane, train, etc.) so long as it pivots at one end on the frame assembly 204.

Figure 17:
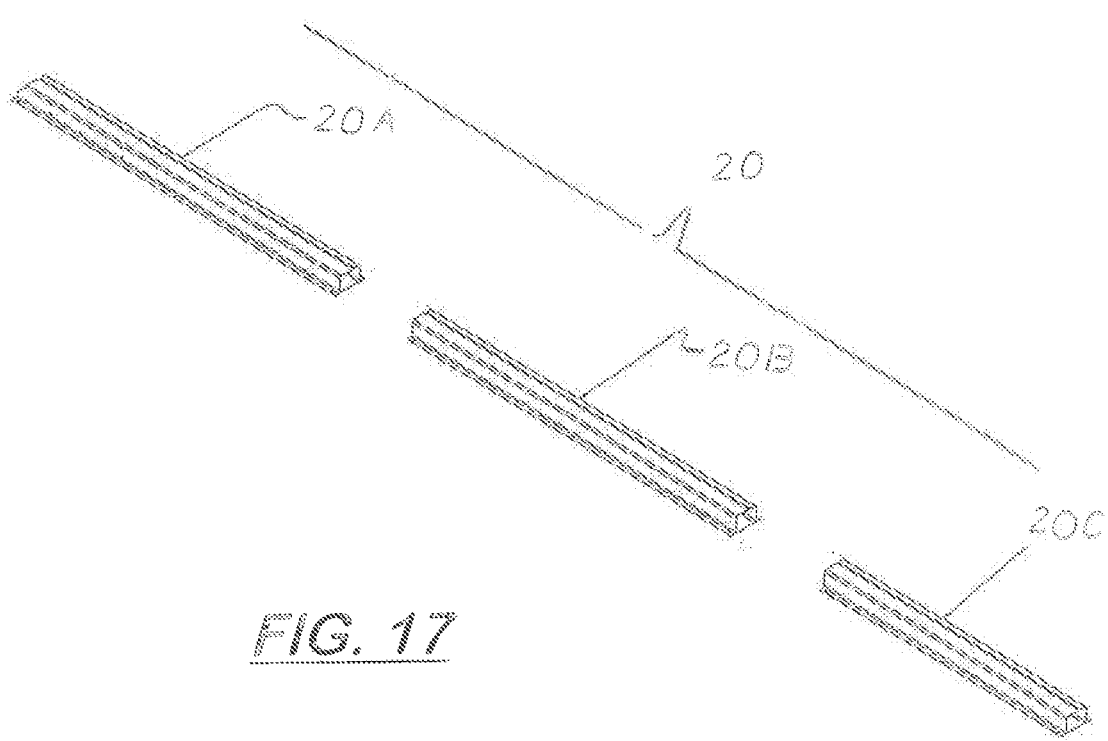
FIG. 17 is a perspective, exploded view of three track sections being longitudinally aligned.
Figure 18:
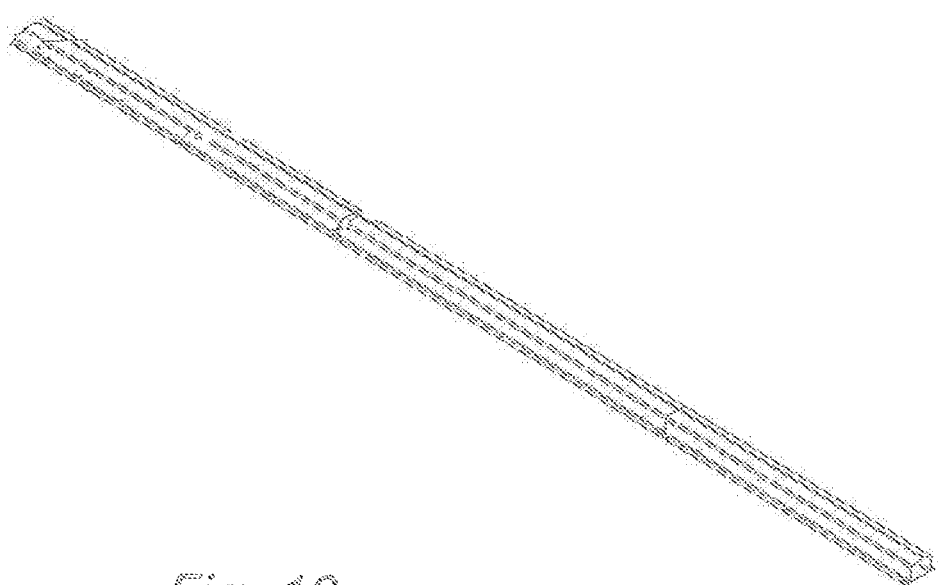
FIG. 18 is a perspective view of the three track sections connected to elongate the track enabling it to accommodate more pushcart.
Figure 19:
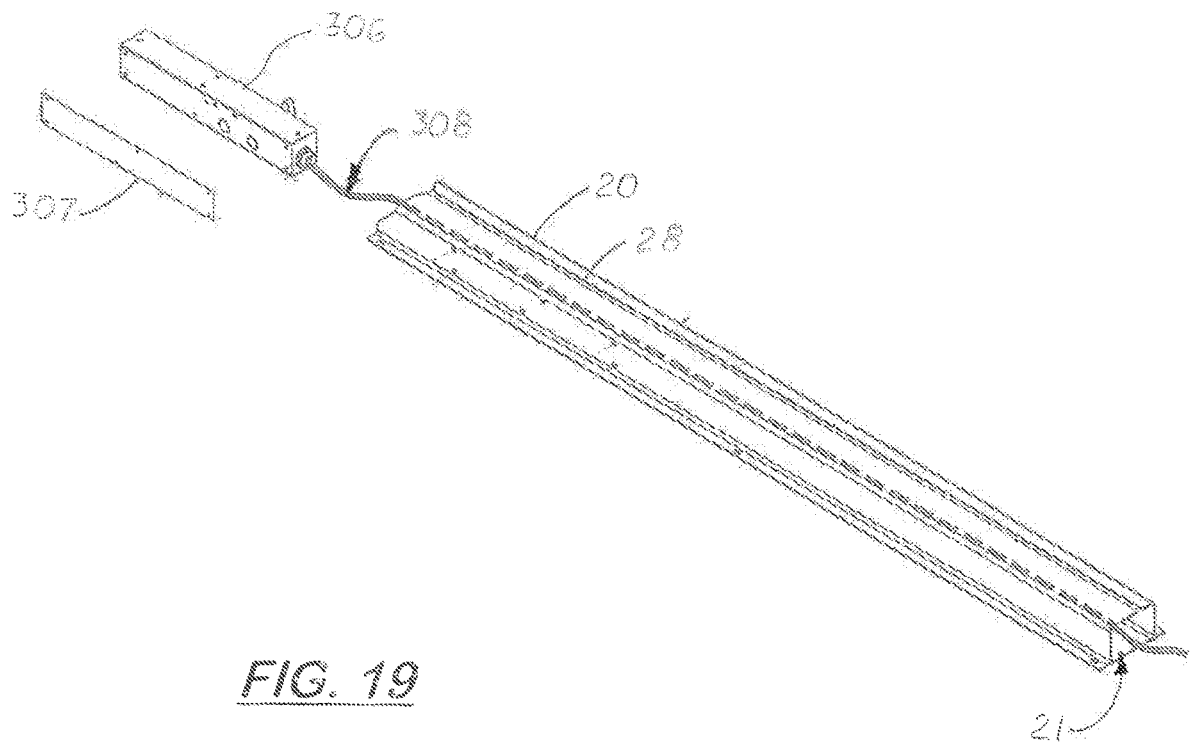
FIGS. 19 and 20 are perspective views of a track showing the gate assembly inserted into one end.

The track 20 is made of a plurality of straight track sections 22A, 22B, connected in an end to end manner to form a continuous structure. End track section 22A includes as diagonal entry opening 23. Each track section 22A, 22B is made of metal and is square or rectangular in cross section as shown in FIGS. 17 and 18. A center space 21 is formed inside the track 20. A continuous, longitudinally aligned slot 28 is formed on the top flange of each track 22, 22'. The track 20 after assembly includes an entry track section 22A with an open end 23 and on or more middle tract sections 22B. The open end 23 of the entry track section 22A is near a vending unit 40 that is coupled to a dual directional gate assembly 299 mounted inside the track 20. When the desired money, tokens, or credit/debit transaction cards are deposited into the vending unit 40, a release signal is sent to a solenoid 386 inside the gate assembly 299 that unlocks a blocking arm 314 inside the center space 21 thereby allowing one pushcart 200 to be moved longitudinally over the track 200 and removed. In one embodiment, the blocking arm 314 can rotate freely in the opposite direction allows customers to easily return pushcarts 200 to the track 20.

Figure 13:
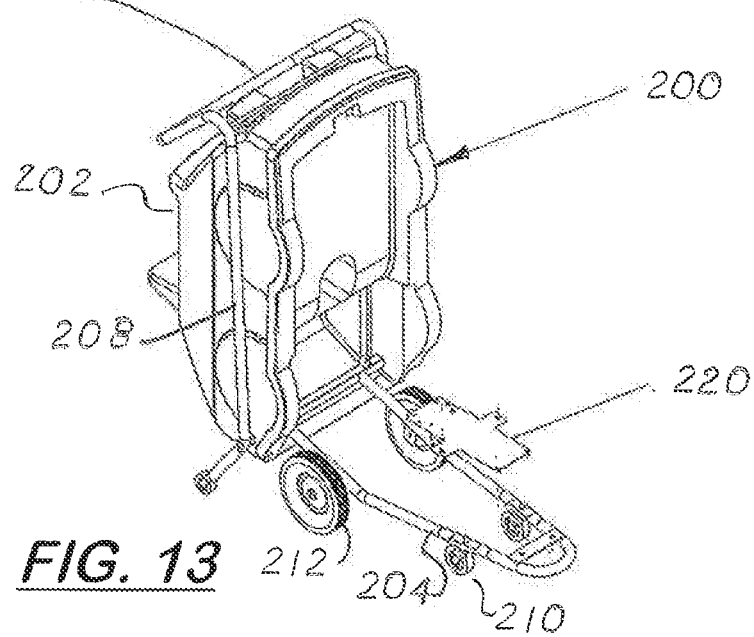
FIGS. 13 and 14 are perspective view of a pushcart found in the prior art showing the body aligned in a vertical orientation and showing the catch bar assembly used in the invention disclosed herein being attached to the front section of the rigid frame.
Figure 14:
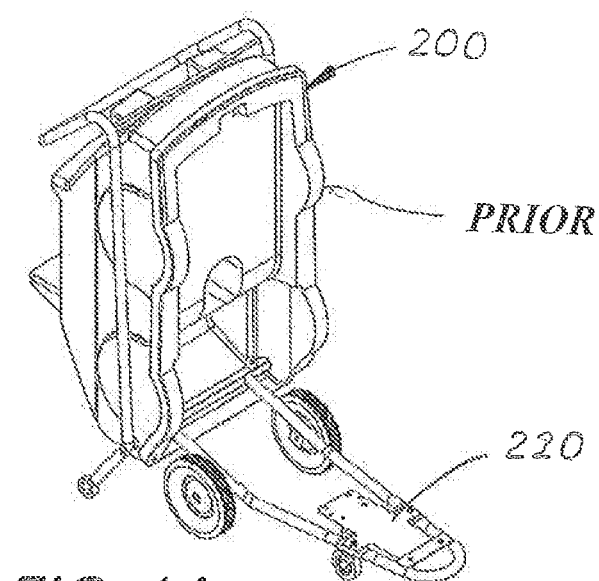
Figure 15:
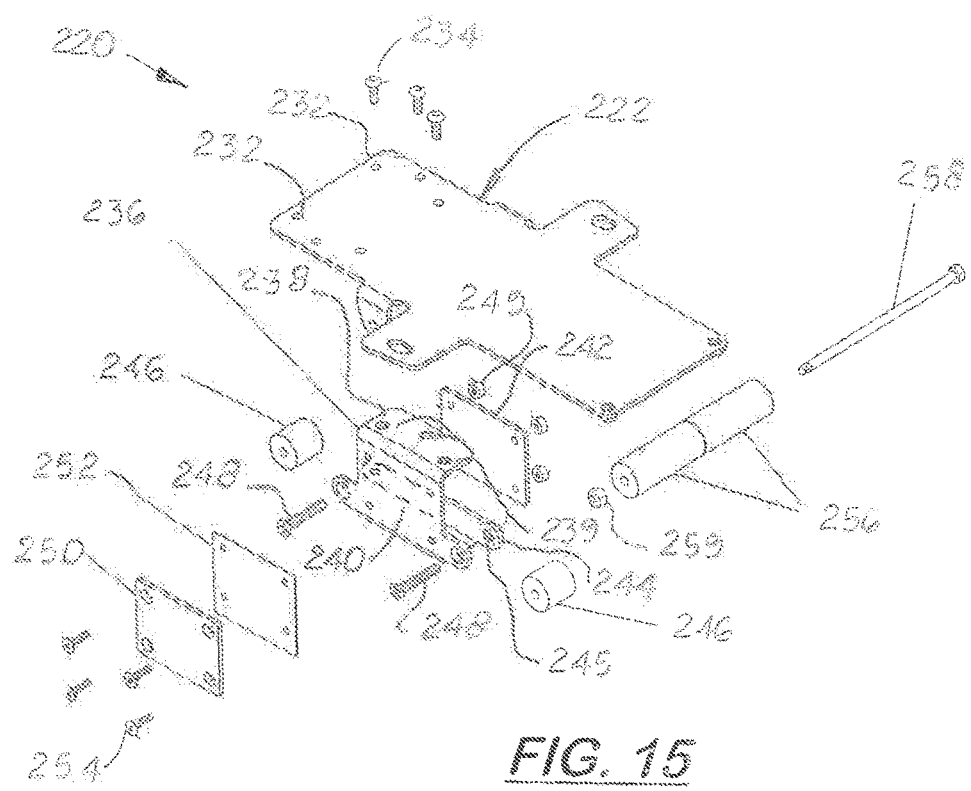
FIG. 15 is a perspective, exploded view of the catch bar assembly.
Figure 16:
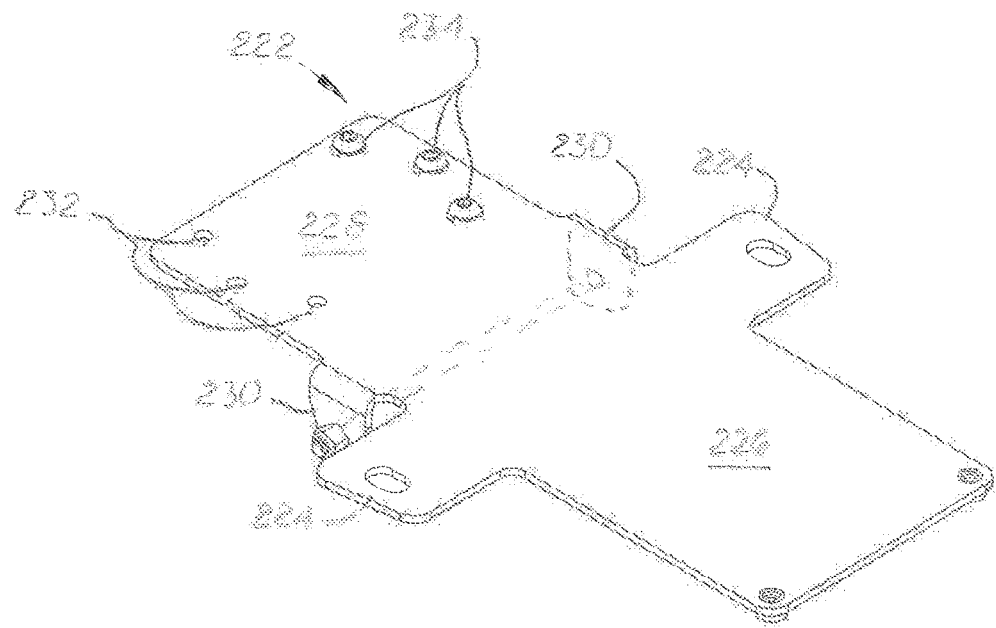
FIG. 16 is a perspective view of the catch bar assembly.

As shown in FIGS. 13-14 mounted on the front section of the frame assembly 204 is a catch bar assembly 220. As shown in FIGS. 15-16, the catch bar assembly 220 includes a fiat plate 222 with two laterally extending guide wings 224, a front section 226, and a rear section 228. Formed in the wings 224 are holes that receive the bolts attached to the front caster wheels 210 on the pushcart 200. Extending downward from the flat plate adjacent to each wing 224 is a tab 230. The tabs 230 are sufficiently spaced apart to receive the upper roller 256. Holes are formed on the tabs 230 that receive the upper axle 258 used with the upper roller 256. Formed on the opposite sides of the rear section are two sets of three holes 232. Extended into one set of three holes 232 are three threaded connectors 234.

Disposed below the flat plate 222 is an L-shaped roller plate 236 that attaches via bolts to one of the two sets of holes 232 on the rear section 228. The roller plate 236 includes an upper flange 238 and a perpendicularly aligned wear flange 240. The wear flange 240 includes two longitudinally aligned ears 241 that extend forward and rearward. The roller plate 236 may be selectively attached to one of the two sets of holes 232 so that the wear flange 240 is aligned outward. Formed on each ear 241 is a hole 242. Located adjacent to the inside surface of the wear flange 240 is an elongated roller bar 244. Formed on each end of the roller bar 244 is a threaded hole 245 that is aligned and registered with the holes 242, 245 formed on the two ears 241. During assembly, short rollers 246 are aligned and registered with the holes 242 and placed between the inside surface of the wear flange 240 and the roller bar 244. Bolts 248 are then inserted into the holes 242, 245 to hold the rollers 246 in place on the wear flange 240.

Attached to the outside surface of the wear flange 240 is an optional conductive metal plate 253 that acts as part of a sensor assembly to detect movement of the wear flange 240 inside the track 20. The metal plate 253 is held in place by an outer plate 250 attached via bolts 254 and nuts 249.

Figure 21:
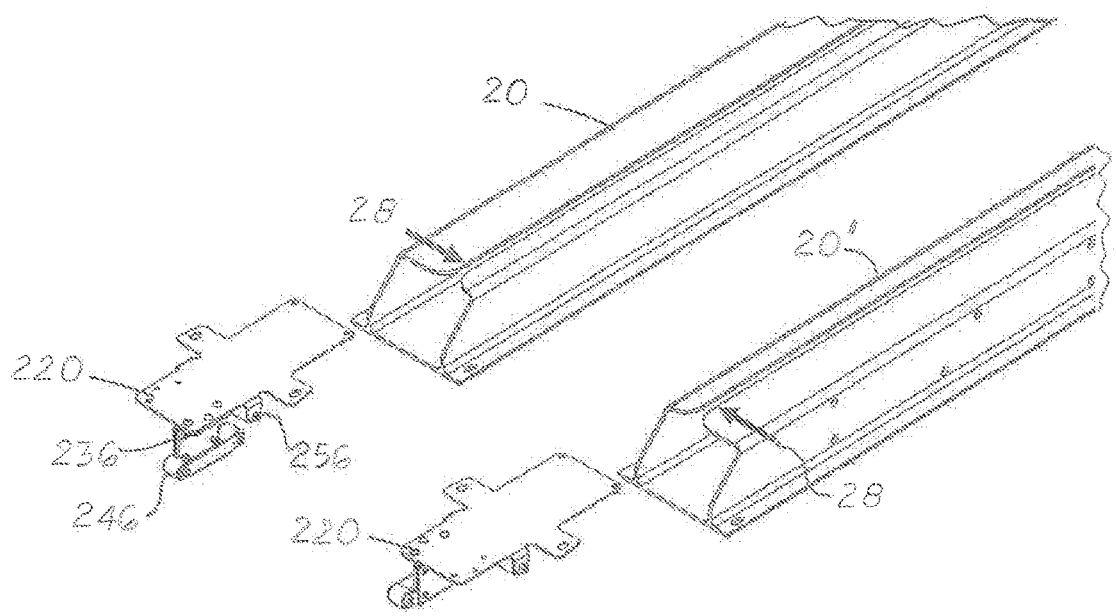
FIG. 21 is perspective view of two parallel tracks showing two catch bar assemblies with their upper and lower rollers being repositioned enabling the catch bar assemblies to slide into the track's open ends.
Figure 22:
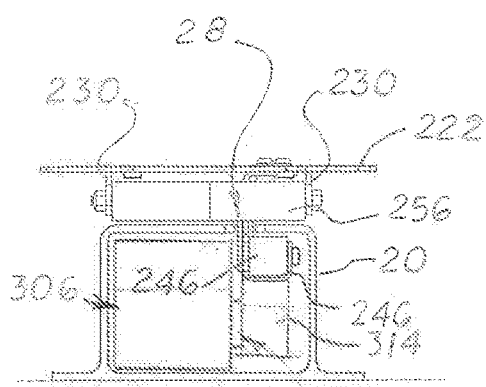
FIG. 22 is an end elevational view of the track and catch bar assembly with the lower roller aligned to the right.

During assembly, the roller plate 236 must be oriented on the catch bar plate 222 in a position for used with track 20 having an offset slot 28. The catch bar plate 222 is connected to the frame assembly 204 so the roller plate 236 is located behind the caster wheels. FIGS. 21, 22, and 22 show how attaching the roller plate 236 in different positions is necessary to engage the offset slot 28 formed on the track 20.

Figure 20:
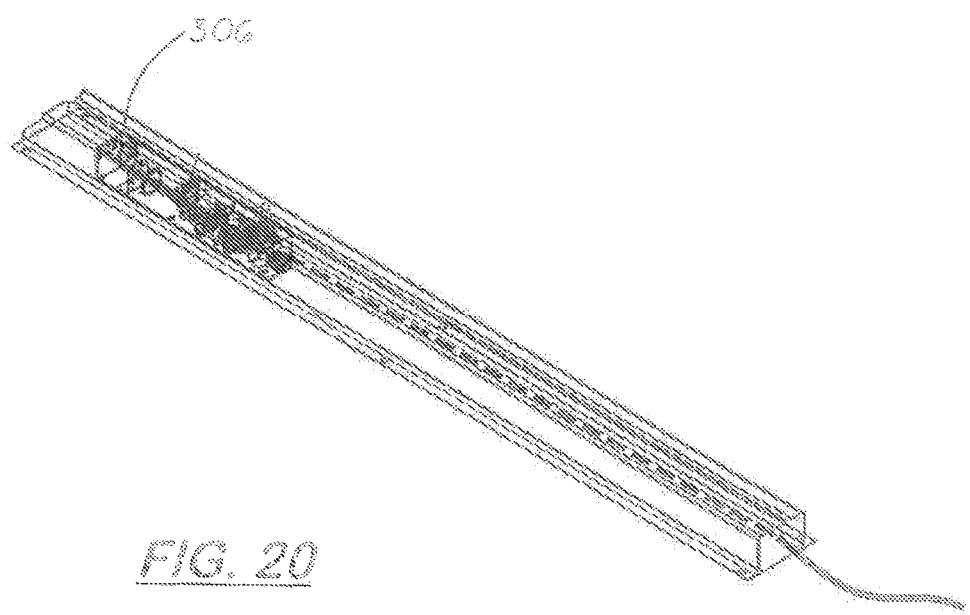
Figure 23:
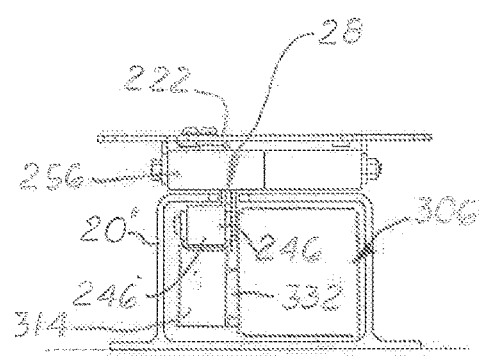
FIG. 23 is an end elevational view of the track and catch bar assembly with the lower roller aligned to the left.

During use, the catch bar assembly 220 is inserted into the entry open end 23 of the end track section 22 as shown in FIG. 20. The wear plate 240 on the roller plate 236 240 fits into a slot 28 and the upper roller 256 rolls over the outside surface of the top flange 238 of the track section 22 and the lower roller 240 rolls against the inside surface of top flange 238. When the pushcart 200 is returned to the track 20, the catch bar assembly 220 slides inside the slot 28 and the lower roller 246 presses against the blocking arm 314 located inside the track 20. In the embodiment described herein, the blocking arm 314 may rotate freely in the inward direction allowing the pushcart 200 to slide over the blocking arm 314. As shown in FIGS. 22 and 23, the blocking arm 314 extends laterally from the side of the gate box 306 located inside the track 20. The blocking arm 314 is in alignment with the lower roller 246.

Figure 24:
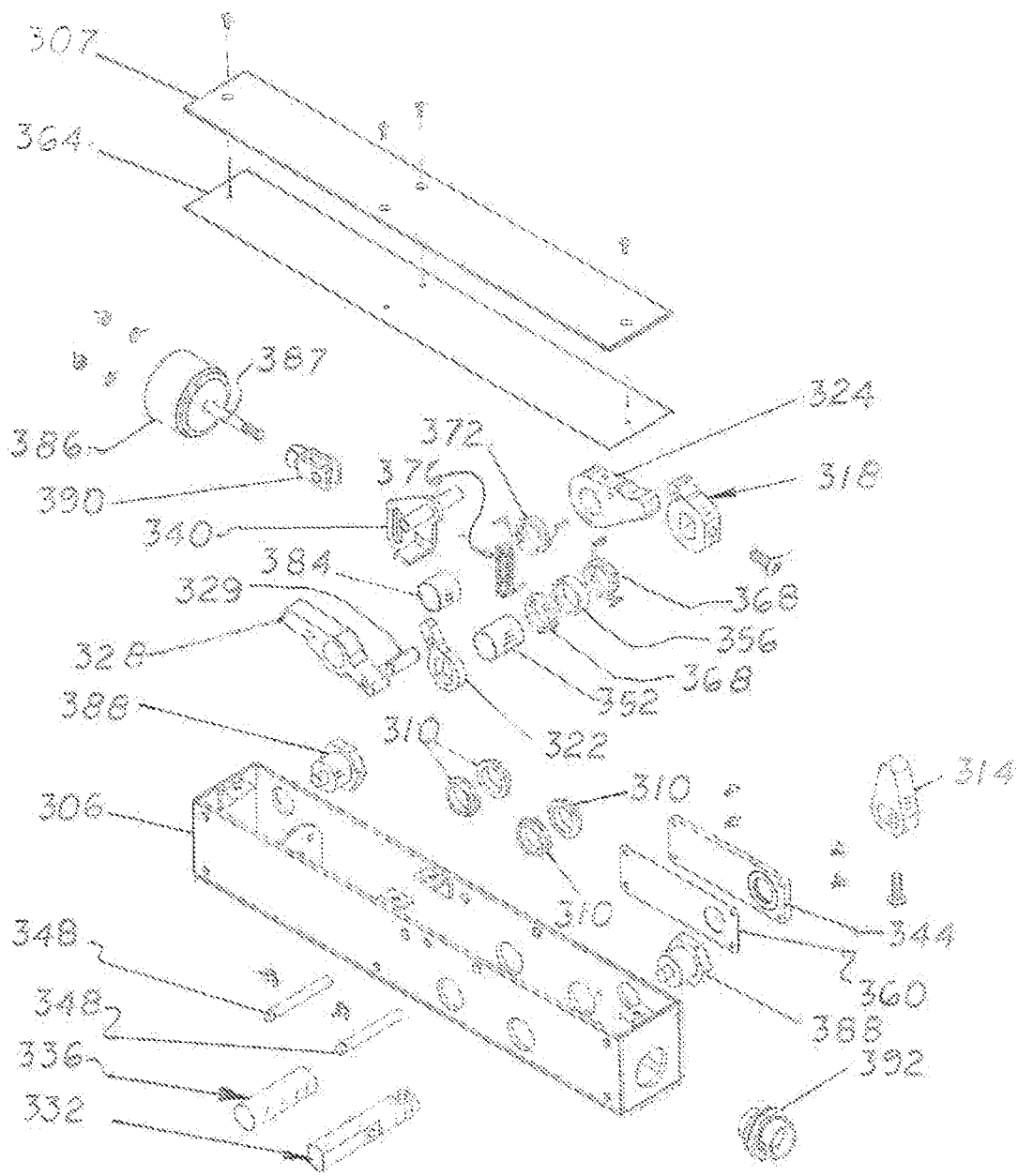
FIG. 24 is an exploded view of the gate box.
Figure 29:
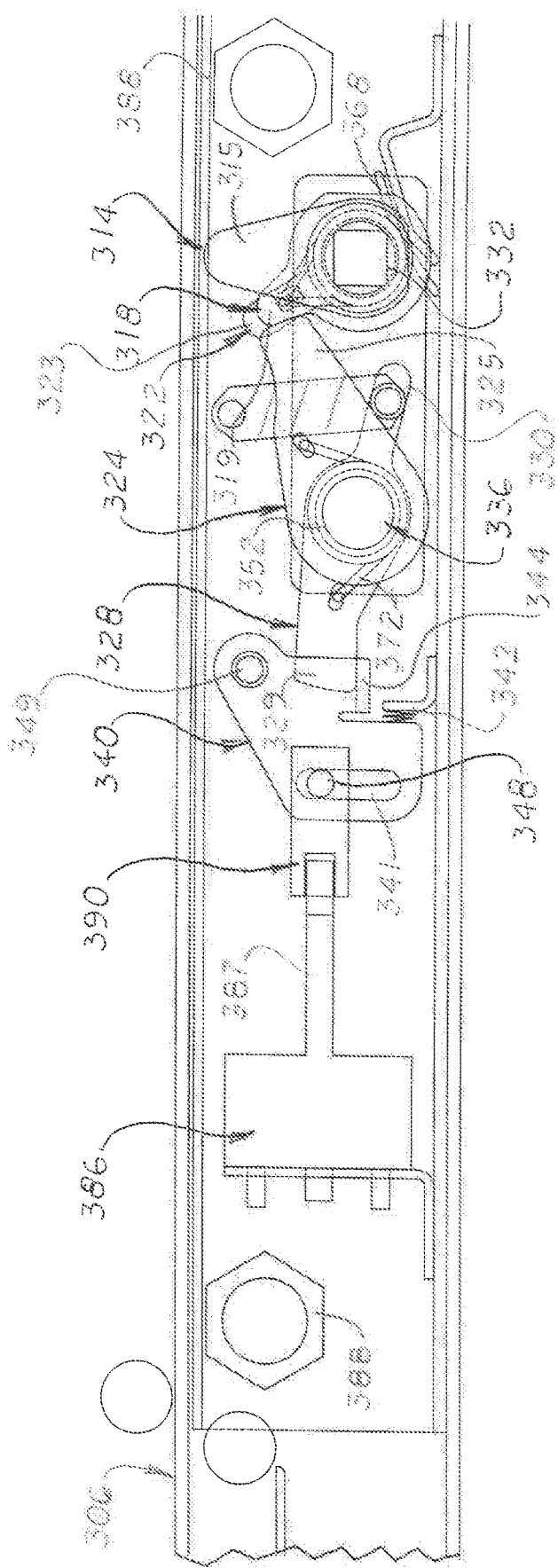
FIG. 29 is a side elevational view of the gate box with the solenoid deactivated and the blocking arm in a blocking position.
Figure 30:
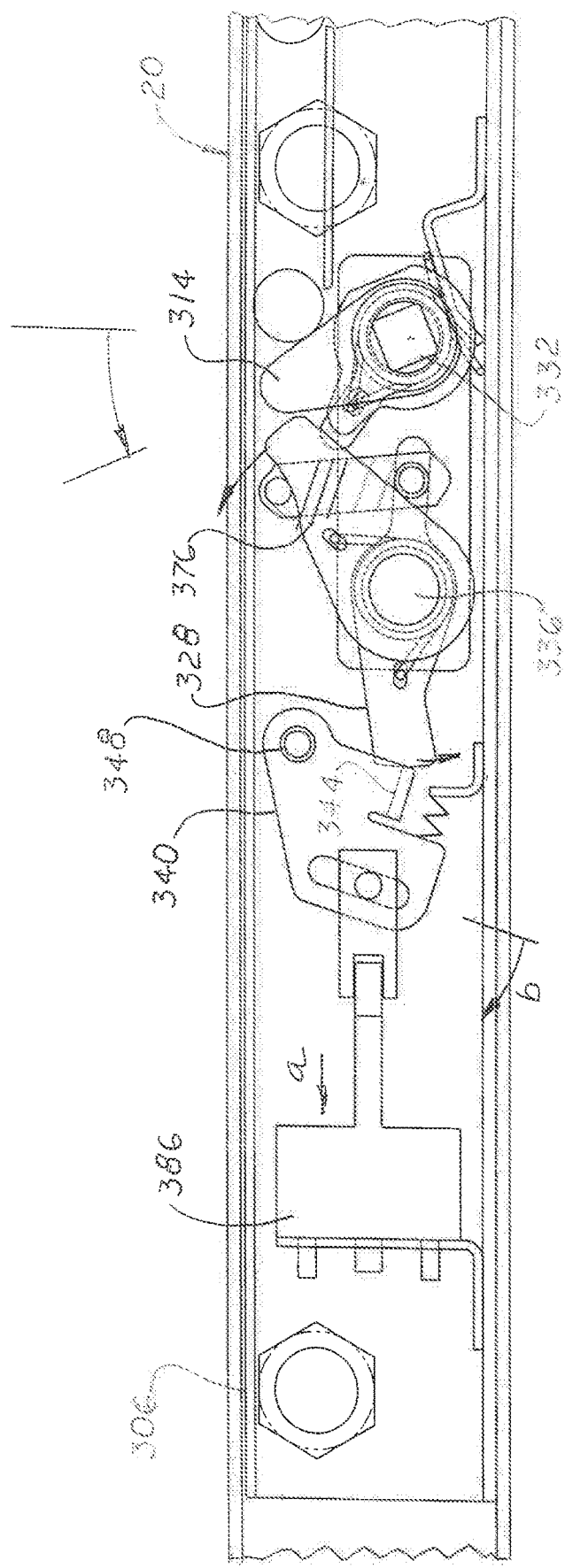
FIG. 30 is a side elevational view of the gate box with the solenoid activated that causes the latch to pivot (counter-clockwise) allowing the blocking arm to rotate, (counter-clockwise).
Figure 31:
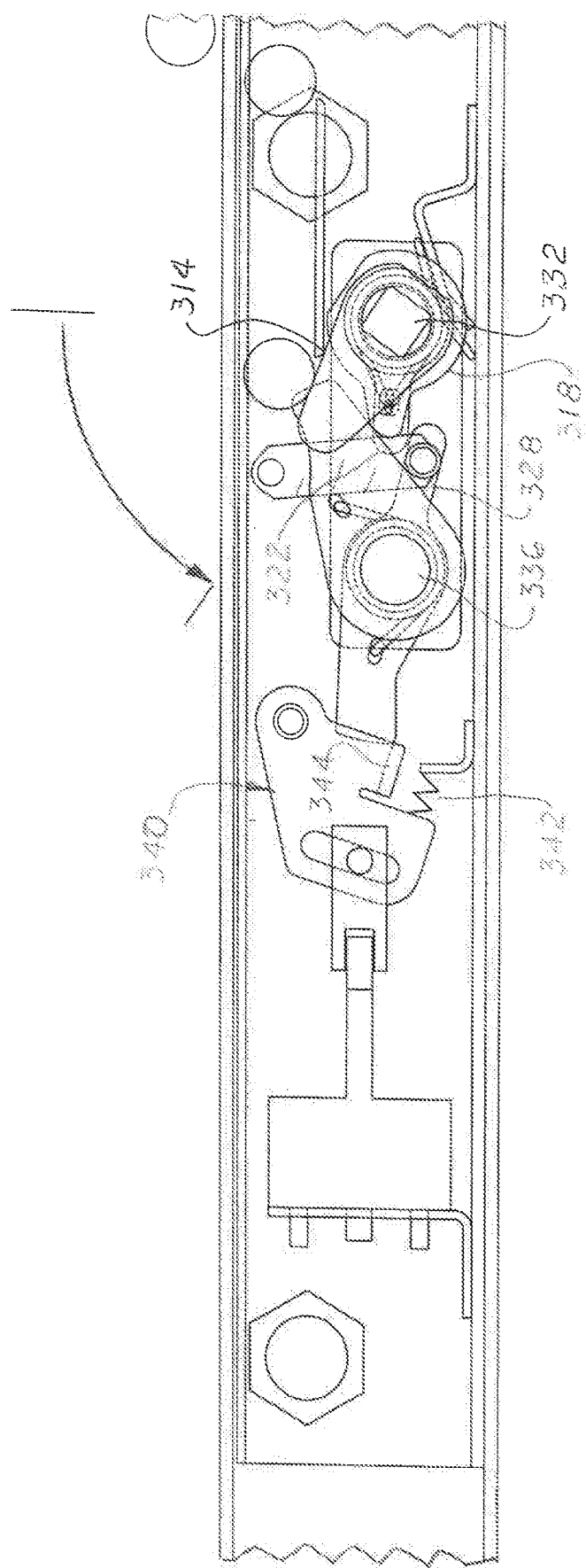
FIG. 31 is a side elevational view of the gate box with the solenoid deactivated causing the latch to return to its original position and block movement of the blocking arm.

The blocking arm 314 is part of the dual directional gate assembly 299 mounted inside the track 20. As shown in FIG. 24, the dual directional gate assembly 299 includes the following parts:

306 gate box
307 cover
310 flange sleeve bearing
314 blocker arm
318 cam element
322 push rod
324 latch
328 follower rod
332 driver shaft
336 driven shaft
340 solenoid release sub assembly
344 enclosure seal plate
348 pivoting shaft
352 thrust spacer
356 thrust spacer
360 plate gasket
364 cover gasket
368 torsion spring
372 torsion spring
376 extension spring
382 lock washers
384 spacer
386 solenoid
388 sensors
390 u-shaped connectors
391 bolt
392 electrical adapter
393 washer
394 nuts
395 screen
396 bolts The dual directional gate assembly 299 is shown in FIG. 24 and in FIGS. 29-31 is mounted inside the track section 22. The dual directional gate assembly 299 includes an elongated gate box 306. Extending from one side of the gate box 306 is a driver shaft 332. The blocker arm 314 is mounted on the exposed end of a driver shaft 332 and inside the space formed between the inside surface of the track section 22 and the gate box 306 as shown in FIGS. 22 and 23.

As shown in FIGS. 24, mounted on the portion of the driver shaft 332 located inside the gate box 306 is a cam element 318 and a push rod 322. Extending transversely inside the gate box 306 and parallel with the driver shaft 332 is a driven shaft 336. Mounted on the driven shaft 336 is a latch 324 and a follower rod 328.

The blocker arm 314 is fixed on the exposed end of the driver shaft 332 with a protruding element 315 pointed upward. The cam element 318 and push rod 322 are also fixed to the driver shaft 332 and located inside the gate box 306 and aligned on the driver shaft 332 with their protruding elements 319, 323, respectively, pointed diagonally rearward and upward approximately 30 degrees. The torsion springs 368 causes the driver shaft 332 to automatically rotate so the blocker arm's protruding element 315 is biased upward and the protruding elements 319, 323 on the cam element 318 and push rod 322, respectively, are aligned rearward and extend upward.

As shown in FIG. 29-31, located inside the elongated gate box 306 and rearward from the driver shaft 332 is a transversely aligned driven shaft 336. The driver shaft 332 and driven shaft 336 are parallel. Mounted on the driven shaft 336 is an oval-shaped latch 324 that extends forward and sufficient in length to prevent the driver shaft 332 and the blocker arm 314 from rotating to an unblocking position needed to allow the pushcart 200 from sliding over the track 20. Mounted on the driven shaft 336 is a coil spring 368, a spacer 352, and a follower body 328. During assembly, the latch 324 is fixed in the driven shaft 336 and includes a forward arm 325 that automatically presses against the protruding element 319 formed on the cam element 318. The latch 324 prevents rotation of the cam element 318 and the blocker arm 314 towards the driven shaft 336.

The follower rod 328 includes a lateral strut that connects to a torsion spring 368 that attaches to an upper rod 450 that extends transversely over the gate box 306 and above the driven shaft 336. A spring 368 biases the proximal end 329 of the follower rod 328 upward. The second torsion spring 372 biases the driven shaft 336 so the front arm 325 on the latch 324 rotates (clockwise direction as shown in FIG. 29) towards the cam element 318. When the cam element 318 returns to its resting position, the front arm 325 on the latch 324 rotates and presses against the cam element 318 preventing rotation of the blocker arm 314 towards the driven shaft 336.

The solenoid 386 when activated produces a short 1 to 2 second movement to a plunger rod 387 that is connected to a coupler 390. The coupler 390 is attached to a pin 348 that extends through a slot 341 formed on the solenoid release arm sub-assembly 340. The solenoid release arm sub-assembly 340 is mounted at its upper end to a transversely aligned pivot shaft 349. When at rest, the rear end of the follower rod 328 rests against a stop surface 344 formed on the sub-assembly 340. When the solenoid 386 is activated, a spring 342 located under the sub-assembly 340 causes the sub-assembly 340 to rotate in a clockwise direction. When the sub-assembly 340 is rotated, the end of the follower rod 328 rotates in counterclockwise direction caused by the biasing force created by on the second spring 372. Because the latch 324 is mounted on the driven shaft 336, the latch 324 rotates in a counterclockwise direction allowing the cam element 318 mounted on the driver shaft 332 to rotate in a counterclockwise direction also. The user can then slide the pushcart catch bar 220 attached to the pushcart 200 against the blocker arm 314 causing the blocker arm 314 to sufficient rotate so the catch bar 220 slides over the blocker arm 314.

The dual direction gate assembly 299 is designed to automatically lock after one pushcart 200 travels over the blocker arm 314. As the pushcart 200 travels over the blocker arm 314, the cam element 318 is rotated against the follower rod 328. When the solenoid 386 is activated, the distal end 329 of the follower rod 328 rests against the flange surface 344 formed on the solenoid release arm sub assembly 340. As the push rod 322 is forced downward against the follower rod 328, the opposite end of the follower rod 328 is elevated and rises above the flange surface 344 of the solenoid release arm sub assembly 340. The solenoid release arm sub assembly 340 rotates to its original resting position with the stop surface 344 positioned under the distal end 329 of the follower rod 328. A coil spring 376 biases the follower rod 328 upward thereby holding the opposite end of the follower rod 328 against the stop surface 344. Because the follower rod 328 is mounted on the driven shaft 336, the latch 324 rotates rearward (in a clockwise direction shown in FIG. 30) and presses against the cam element 318 which causes the blocker arm 314 to reset in a locked position.

When returning a pushcart 200, the pushcart 200 is positioned over the track 20 so the upper rollers 246 roll over the top flange of the track 20, the vertical wear plate 240 fits into the slot 28 and the lower rollers 246 roll over the inside surface of the top flange. When the pushcart 200 is forced into the track 20, the lower rollers 246 presses against the blocker arm 314 causing it to rotate in a direction opposite the direction it rotates when releasing the pushcart 200. Because the latch 324 prevents the cam element 318 from rotating in the opposite direction, a user can not remove the pushcart 200 from the track 20 once the catch bar assembly 220 has passed over the blocker arm 314. As the catch bar assembly 220 moves over the blocker arm 314, the block arm 314 is further rotated which causes the latch 324 inside the gate box 306 to reset.

Figure 26:
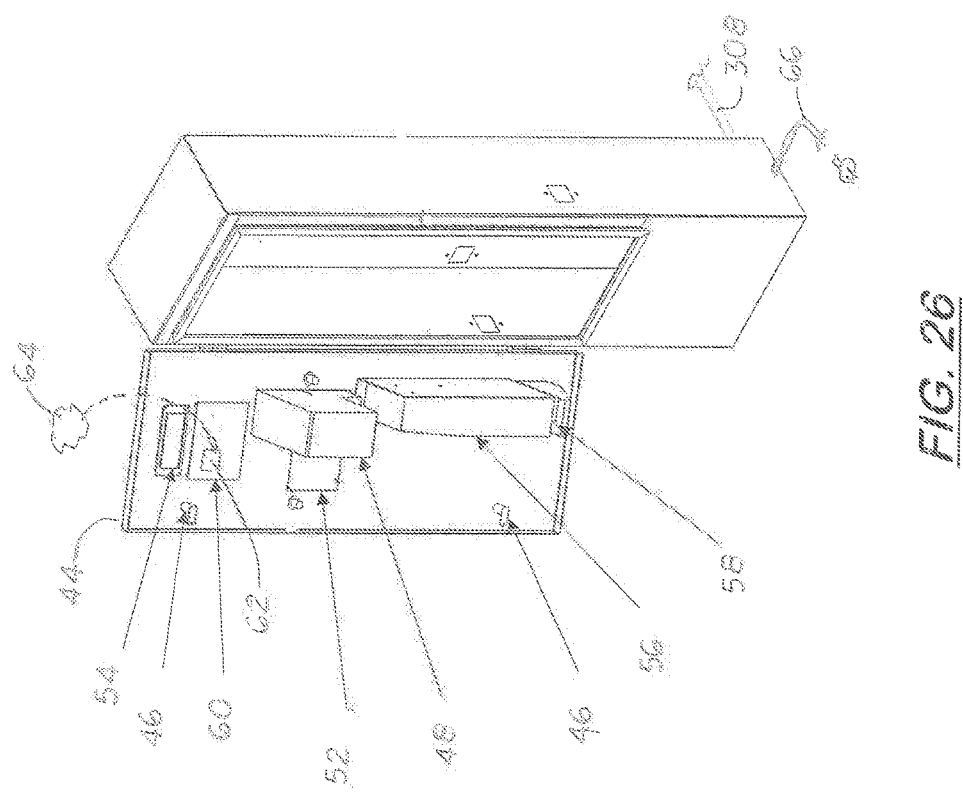
FIG. 26 is a perspective view of the vending unit with the front door open.
Figure 25:
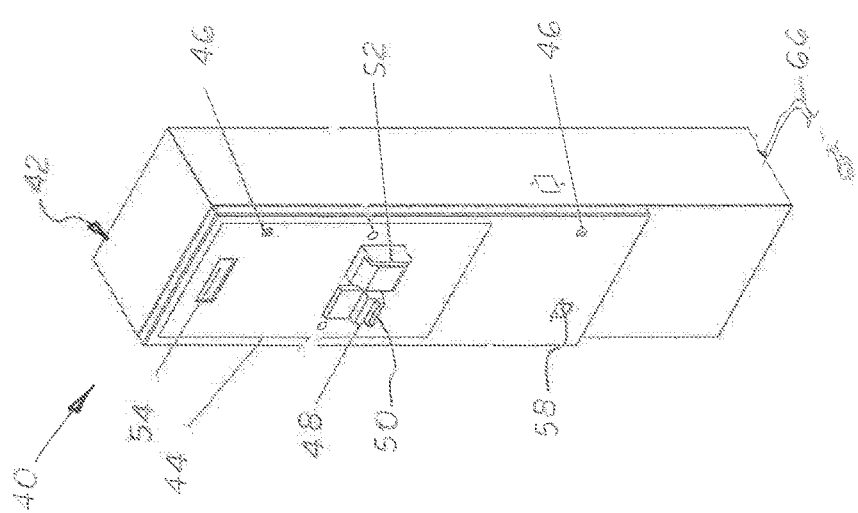
FIG. 25 is a perspective view of the vending unit with the front door closed.

FIGS. 25 and 26 are perspective views of the vending unit 40. The vending unit 40 includes an enclosure box 42, a door 44 with a lock 46, a transaction card processing unit 48 with a cash insert slot 50, a transaction card reader 52, a display unit 54, a reward vault 56 and dispensing tray 58. The vending unit 40 also includes at least one printed circuit board 60, a central processor 62, and a software program 64 loaded into the working memory of the central processor 62. The software program 64 processes payments, issues receipts, controls the movement of the solenoid, receives signals from the switches located in the gate box, controls the presentation of messages on the display and the dispensing of rewards or tokens. The printed circuit board 60 is connected to the processing unit 48, the transaction card reader 52, the display unit 54, and to an external power cord 66. The cable 308 from the gate box connects to the printed circuit board 48 to transmit signals to and from the gate box 306.

In one embodiment, the vending system 40 may include a token/reward system 400 that gives tokens or partial payments to customers who return the pushcart 200 to the track 20. The token/reward system 400 at least two sensors 388 located on the sides of the gate box 306 on opposite sides of the blocking arm 314. When a pushcart 200 is returned, the catch bar assembly 220 is aligned over the track's entry open end of the track and the wear plate 222 is aligned with the slot 28. An identification code may be associated with each wear plate 222 enabling the vending unit 40 to identify the pushcart 200 as being returned.

As the pushcart 200 is moved along the track 20, the catch bar assembly slides along the slot the wear plate 222 passes over a first sensor 338 mounted on the inside surface of the elongated box. A signal is sent to the vending unit 40 informing the vending machine 40 a pushcart 200 is being returned and the wear plate 222 passes over a second sensor 388. A second return signal is then sent to the vending unit 40. The vending unit 40 then releases a token or partial refund of the rental fee.

Figure 4:
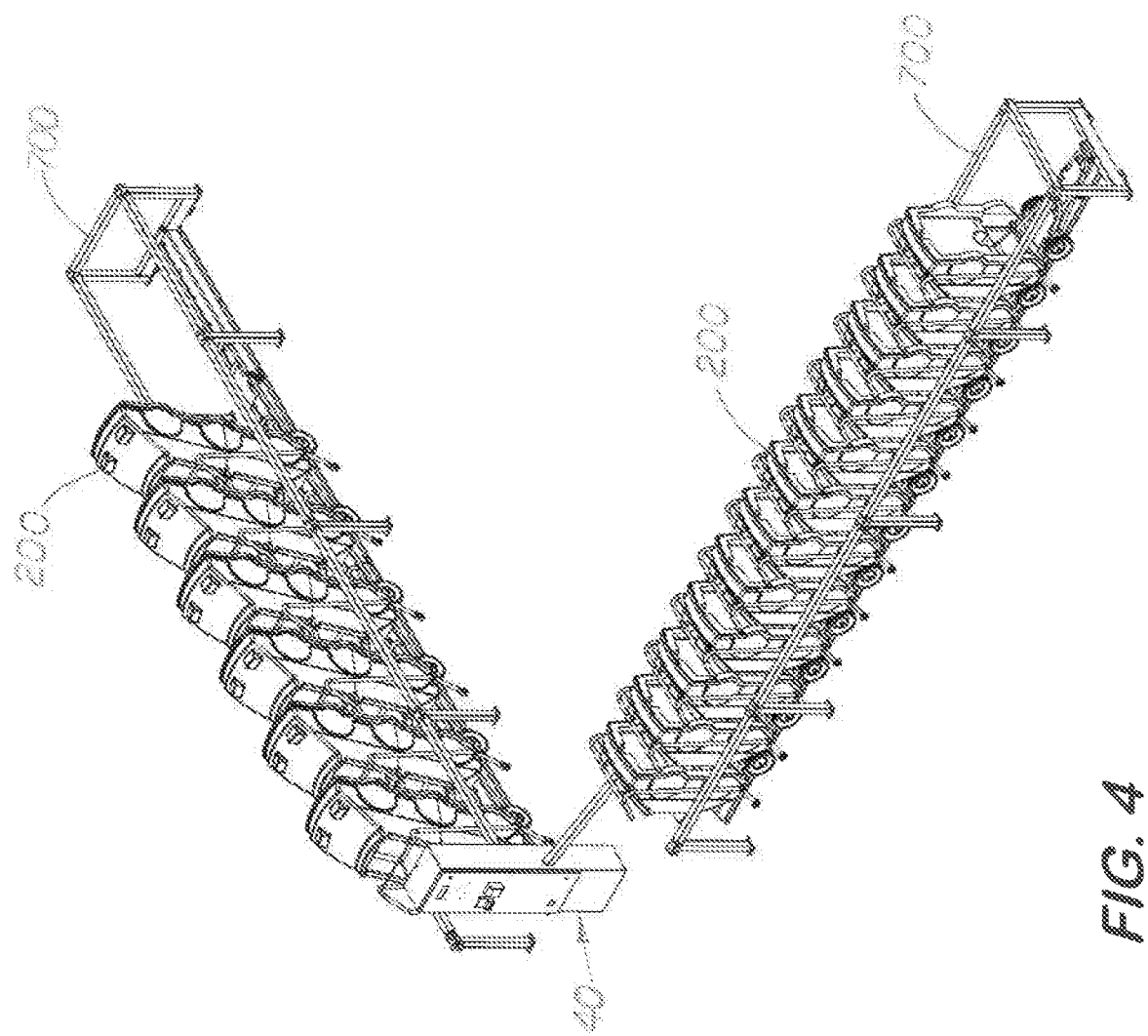
FIG. 4 is a perspective view of the pushcart vending system disclosed herein configured into two L-shaped tracks.
Figure 5:
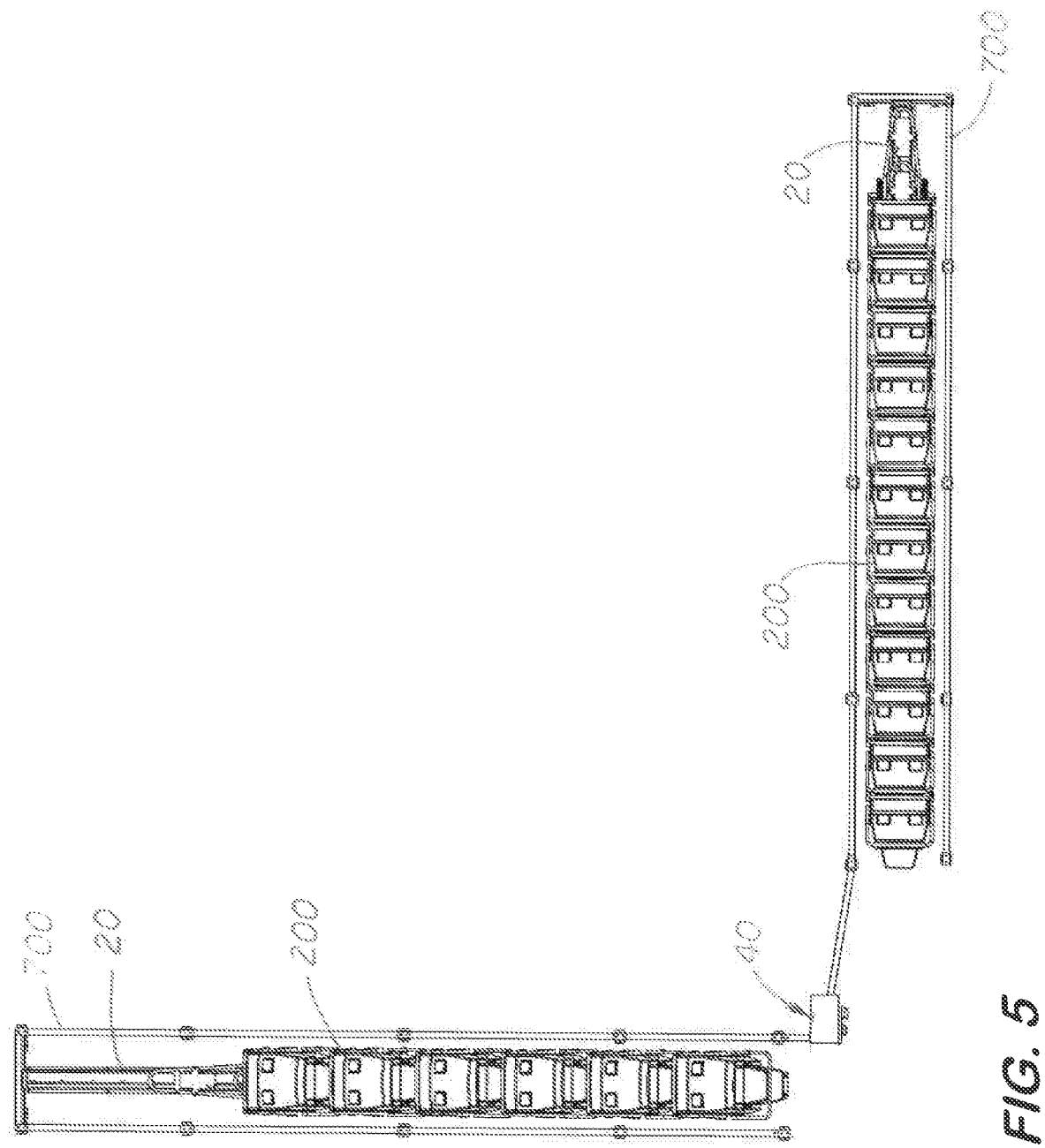
FIG. 5 is a top plan view of the pushcart vending system shown in FIG. 4.
Figure 6:
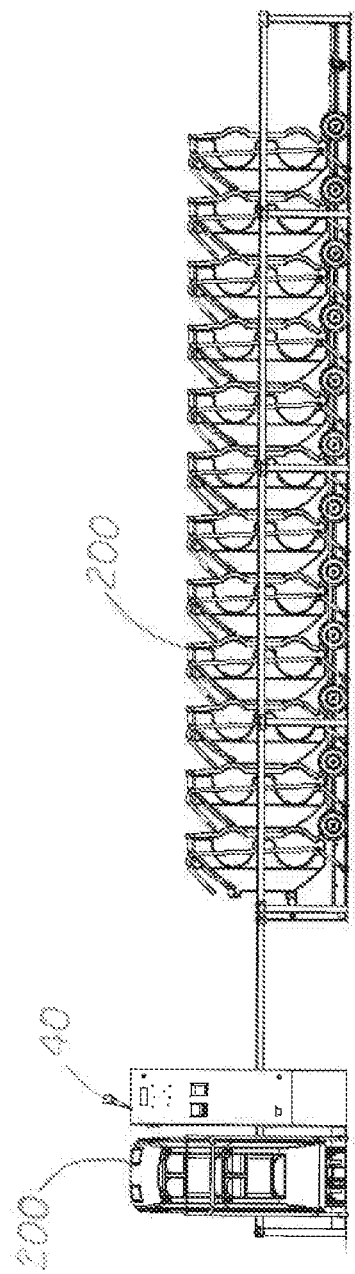
FIG. 6 is a side elevational view of the pushcart vending system shown in FIG. 4.
Figure 7:
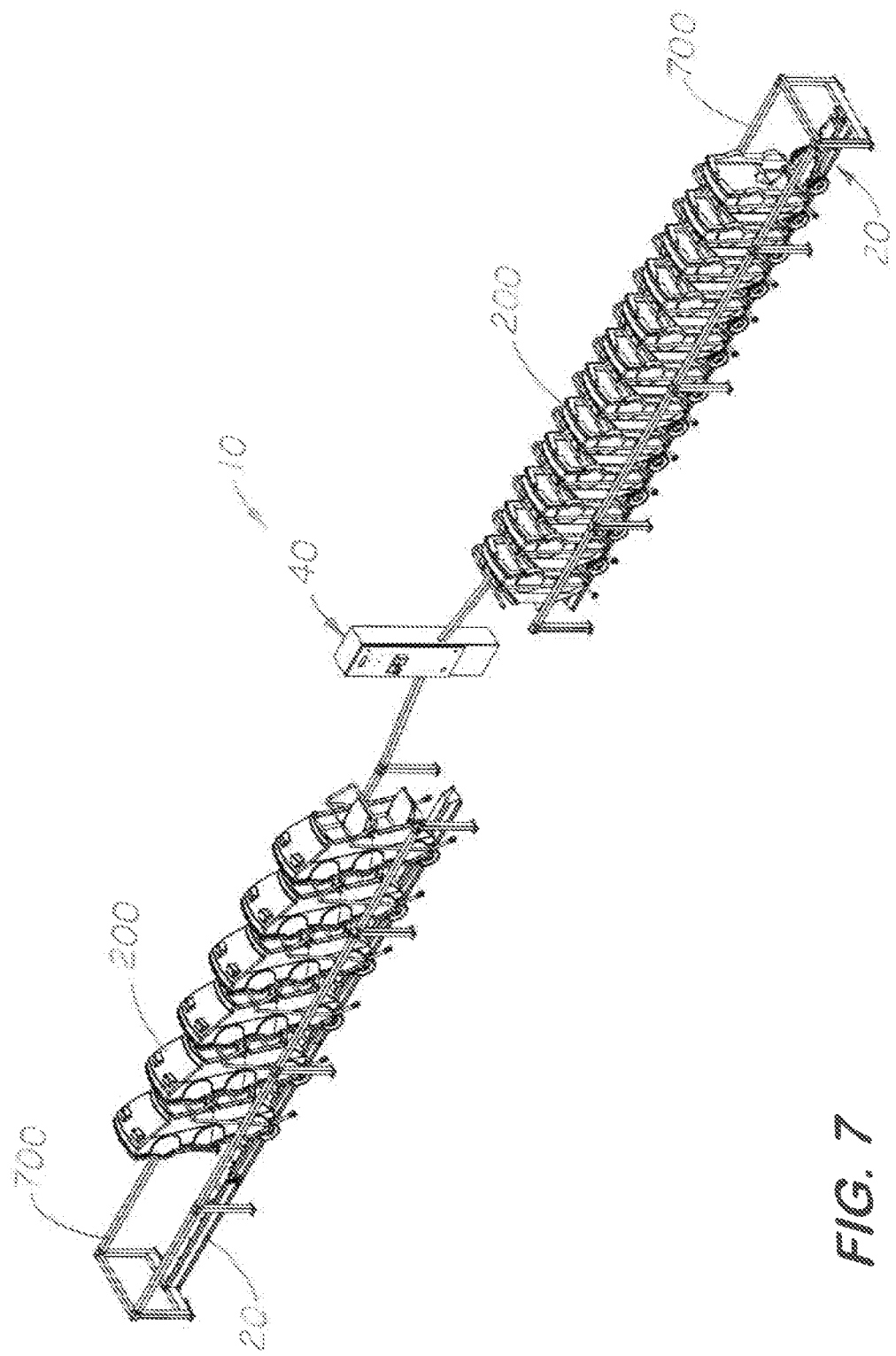
FIG. 7 is a perspective view of the pushcart vending system disclosed herein configured with two in line tracks.
Figure 8:
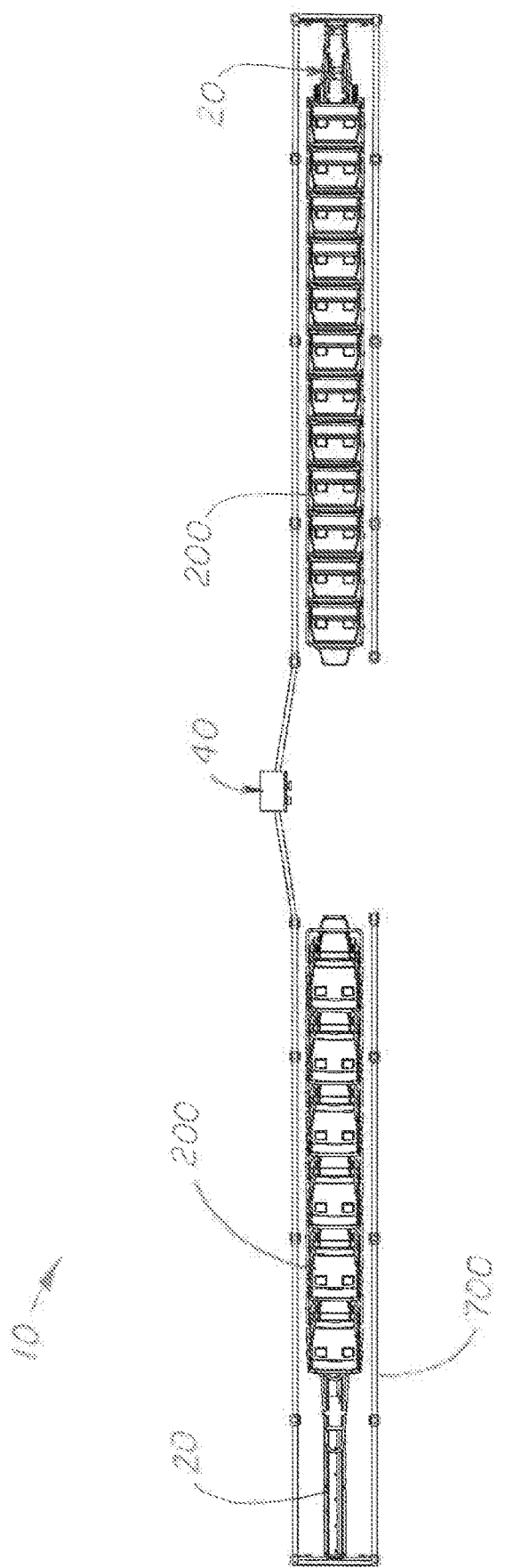
FIG. 8 is a top plan view of the pushcart vending system shown in FIG. 7.
Figure 9:
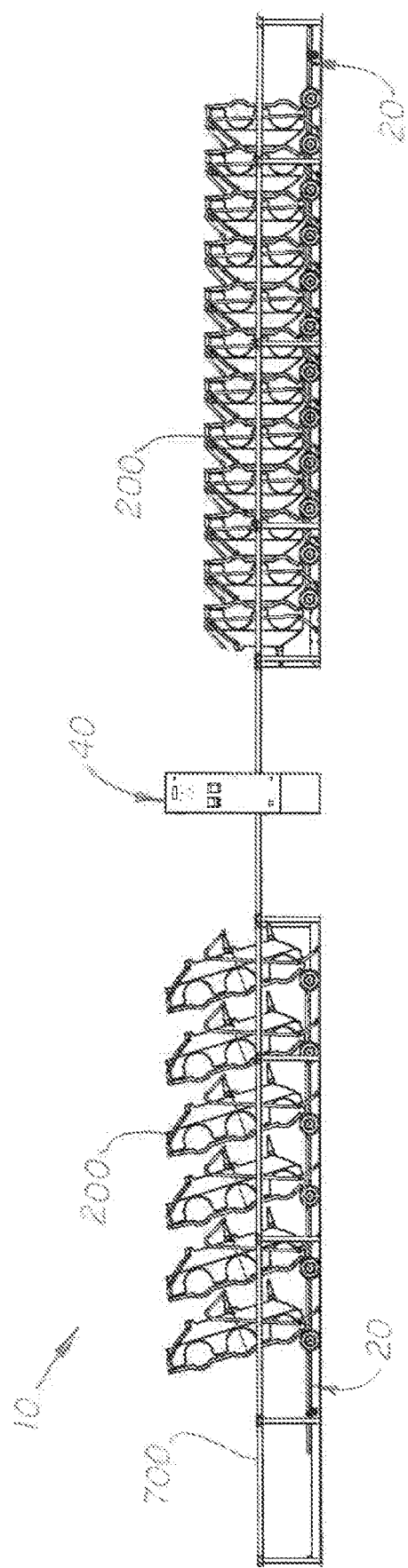
FIG. 9 is a side elevational view of the pushcart vending system shown in FIG. 7.

As shown in FIGS. 1-9, the vending system can be configured in different track arraignments. For example, FIGS. 1-3 show the pushcart vending system 10 configured with one vending unit located between two parallel tracks. FIGS. 4-6 show the pushcart vending system 10 configured with one vending unit 40 between two perpendicularly aligned tracks 20. FIGS. 7-10 show the pushcart vending system 10 configured with one vending unit 40 located between to longitudinally aligned tracks 20.

Figure 10:
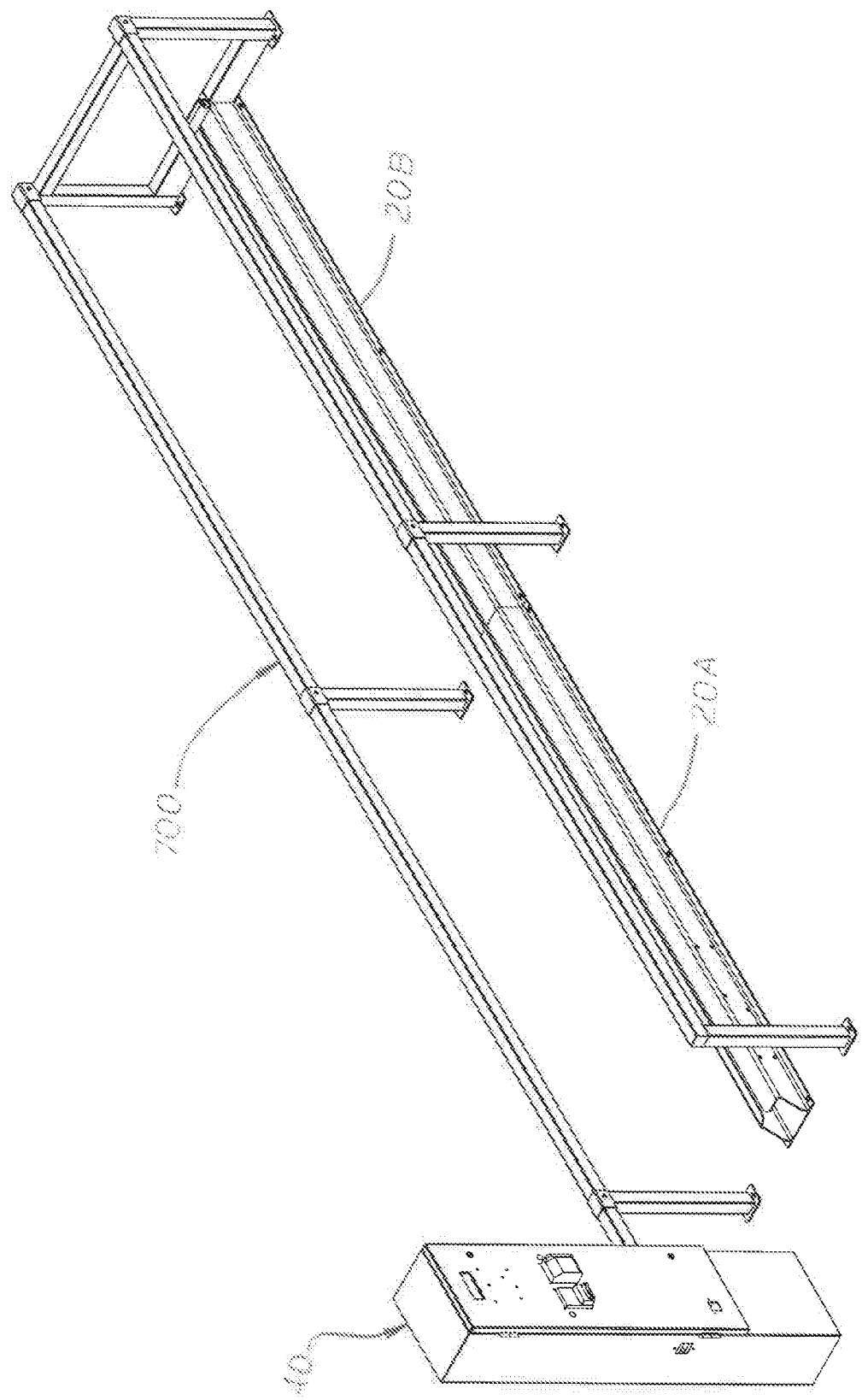
FIG. 10 is a perspective view of the single-track pushcart vending system.
Figure 27:
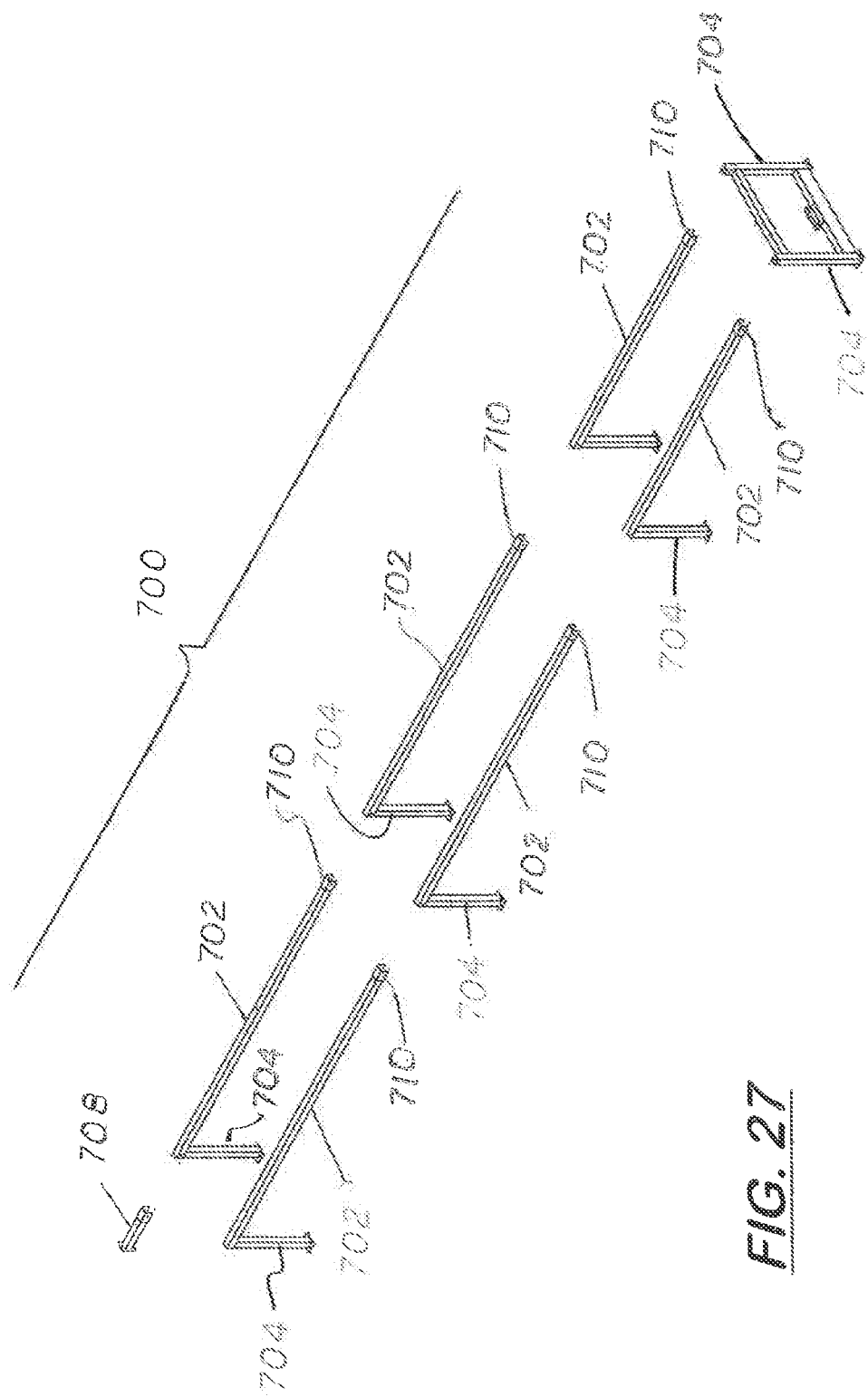
FIG. 27 is a perspective exploded view of the side safety rail guard.
Figure 28:
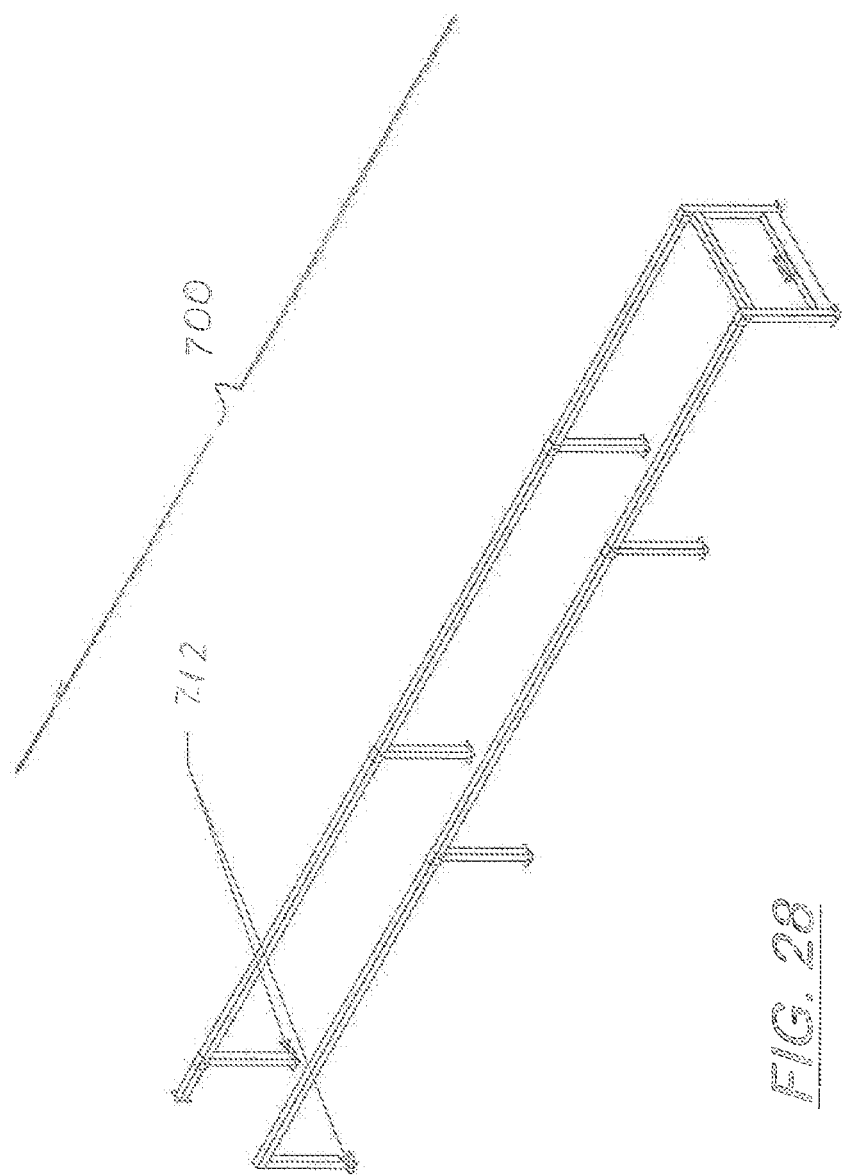
FIG. 28 is a perspective view of the assembled side safety rail guard.

In each embodiment, an optional rail guard system 700 with a plurality of horizontal side rails 702, posts 704, horizontal end rails 706, end connectors 708, couplers 710, and feet 712 is setup around the track (see FIGS. 27 and 28). FIG. 10 is a perspective view of the single track pushcart vending system 10 in which the vending unit 40 is located adjacent to the end opening and rotated 90 degrees.

In compliance with the statute, the invention described has been described in language more or less specific on structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:

1. A dual directional gate assembly for controlling back and forth movement of an object that extends into a slot formed in a track, said dual directional gate assembly, comprising:
   a. a gate box aligned longitudinally inside said track;
   b. a driver shaft transversely aligned inside said gate box;
   c. a blocking arm affixed to said driver shaft, said blocking arm includes an upward extending protruding element configured to make contact with said object moving back or forth in said slot, said protruding element configured to contact said object traveling along said slot and cause said driver shaft to rotate in the direction of movement of said object;
   d. a cam element affixed to said driver shaft, said cam element includes a protruding element that extends upward and rearward from said driver shaft;
   e. a push rod affixed to said driver shaft, said push rod includes a protruding element that extends upward and rearward from said driver shaft;
   f. at least one spring coupled to said driver shaft configured to rotate said driver shaft so that said protruding element on said blocking arm returns to an upright extending position and contacts said object moving along said slot;
   g. a driven shaft transversely aligned inside said gate box;
   h. a latch with a front arm, said latch being mounted on said driven shaft and configured so that said front arm extends diagonally upward and towards said protruding element on said cam element to block rotation of said cam element towards said driven shaft;
   i. a follower rod mounted on said driven shaft, said follower rod includes a distal end and a proximal end located on opposite sides of said driver shaft, said proximal end being sufficient in length to extend under said protruding element on said push arm;
   j. a solenoid released arm sub-assembly pivotally mounted at one end to said gate box adjacent to said distal end of said follower rod, said solenoid release arm sub-assembly includes a stop surface that extends under said distal end of said follower rod and blocks downward rotation of said distal end of said follower rod;
   k. a solenoid that includes a piston arm coupled to said solenoid release arm sub-assembly, when said solenoid is activated said piston moves and causes said solenoid release arm sub-assembly to rotate and disengaging said stop surface from said distal end of said follower rod; and
   l. a spring coupled to said proximal end of said follower rod and coupled to said latch, said spring configured to create an upward biasing force to said proximal end of said follower rod and an upward biasing force to said front arm on said latch upward that forces said proximal end of said follower rod diagonally and towards said cam element.

2. The dual directional gate assembly, as recited in claim 1 further including a spring coupled to said solenoid release arm sub-assembly that causes said solenoid release arm sub-assembly to return to its original position with said stop surface placed under said follower arm.

\* \* \* \* \*